Aug. 13, 1929.                L. B. ANDRESEN                1,724,867
                               HEATING DEVICE
                            Filed July 25, 1927         2 Sheets-Sheet 1

INVENTOR
LAURITZ B. ANDRESEN
BY Paul, Paul & Moore
ATTORNEYS

Aug. 13, 1929.  L. B. ANDRESEN  1,724,867
HEATING DEVICE
Filed July 25, 1927  2 Sheets-Sheet 2
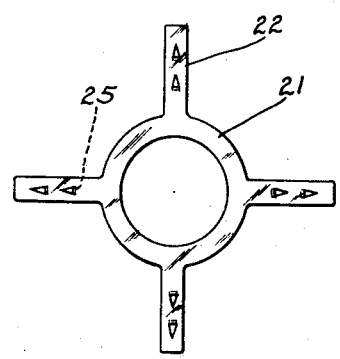
FIG. 3
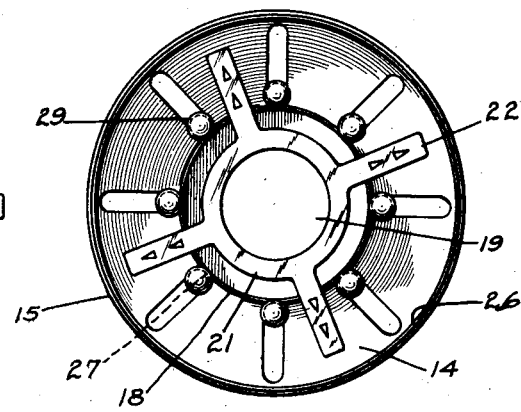
FIG. 2
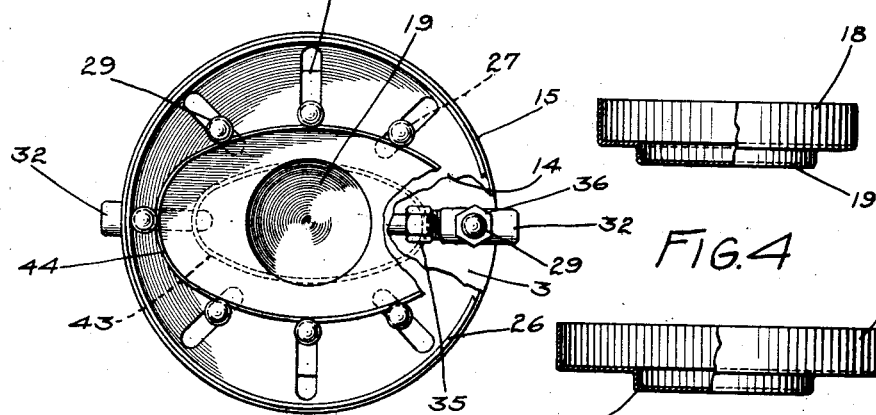
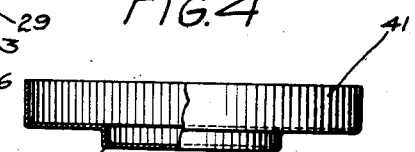
FIG. 4
FIG. 5
FIG. 6
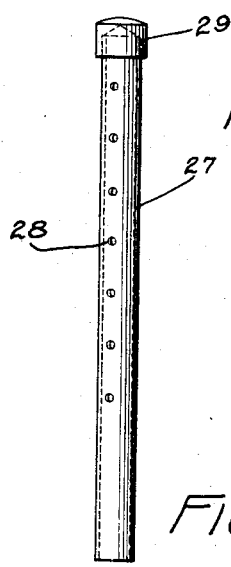
FIG. 7
INVENTOR
LAURITZ B. ANDRESEN
BY Paul, Paul & Moore
ATTORNEYS Patented Aug. 13, 1929.

1,724,867

UNITED STATES PATENT OFFICE.

LAURITZ B. ANDRESEN, OF MINNEAPOLIS, MINNESOTA, ASSIGNOR TO M. F. PATTERSON DENTAL SUPPLY CO., OF ST. PAUL, MINNESOTA, A CORPORATION OF ILLINOIS.

HEATING DEVICE.

Application filed July 25, 1927. Serial No. 208,285.

This invention relates to new and useful improvements in heating devices, particularly adapted for use in the dental art for heating flasks containing invested patterns, and is an improvement over the form shown in Patent No. 1,401,793, issued to K. W. Knapp and W. G. Holmes, December 27, 1921.

An object of the present invention is to provide a heating device having means for radially and independently adjusting the upright heating elements thereof, whereby the device may be adapted for heating flasks or objects of different sizes.

A further object of the invention is to provide a heating device of the above character, comprising a base having a post centrally provided thereon, in which is mounted a plurality of radially extending tubes, the inner ends of which communicate with a source of combustible gas supply, and each tube having a fitting slidably mounted thereon, in each of which is mounted an upright tubular gas discharge member, whereby said tubular members may be radially adjusted to increase or decrease the area encircled thereby, and whereby the heating device may be utilized for heating flasks of different diameters and shapes.

A further object is to provide such a heating device comprising a base having a plurality of upright gas discharge members mounted thereon and each adapted for radial adjustment, and means being provided upon said base between said tubular members for supporting a tray whereon the flask to be heated is placed, the outer annular wall of the tray being adapted to be engaged by the tubular members to provide a gauge therefor, when adjusting them for a given size flask.

A further object is to provide a heating device comprising a plurality of upright tubular gas discharge members adapted for radial adjustment, whereby the device may be utilized for heating objects or flasks of different sizes, and each gas discharge member also being adapted for vertical and rotary adjustment, independently of one another, thus providing such a heating device adapted for heating flasks of various diameters, shapes and heights.

The particular object of the invention therefore, is to provide an improved heating device.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 2 is a plan view of Figure 1, on a smaller scale;

Figure 3 is a view showing the flask supporting member removed from the heating device;

Figure 1:
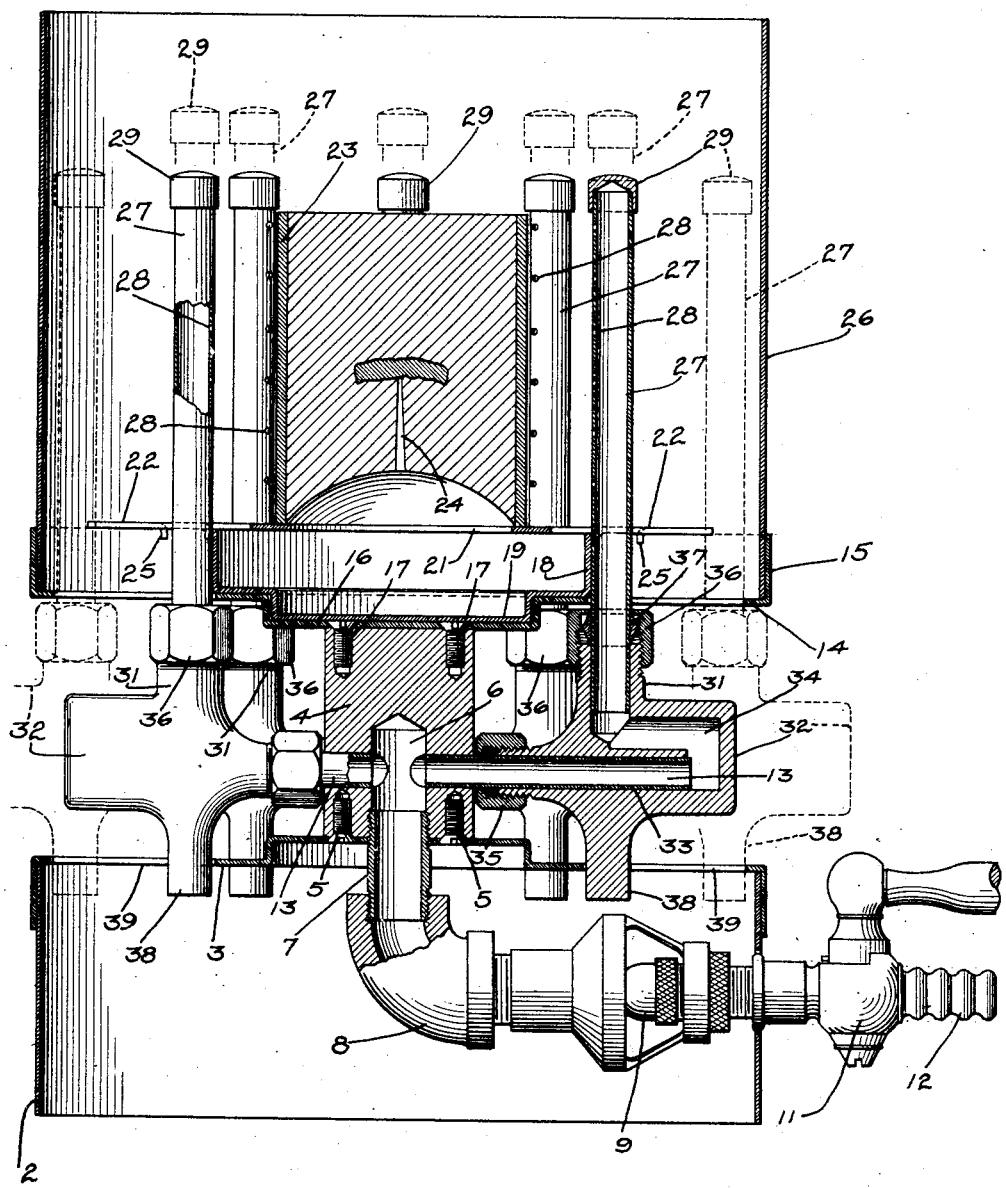
Figure 1 is a vertical sectional view of the improved heating device showing the general construction thereof and the means provided for radially adjusting the gas discharge members with respect to one another.

Figures 4, 5, and 6 are views illustrating trays of different diameters;

Figure 7 is a view illustrating one of the tubular gas discharge members removed from the heating device; and Figure 8 is a view similar to Figure 2, but showing the gas discharge members adjusted to the position assumed when heating an oval shaped flask.

The novel heating device featured in this invention comprises a suitable base 2 having a top wall 3 upon which is mounted an upright post 4, preferably secured to the central portion of the wall by such means as screws 5. The post 4 has a central bore 6 provided in the lower portion thereof which is threaded to receive a nipple 7, as shown in Figure 1. This nipple has a pipe connection 8 with a Bunsen burner 9, of ordinary construction. A control valve 11 is connected with the burner 9, which has a nipple 12 to provide means for attaching thereto a gas supply hose, not shown.

A plurality of tubes 13 are radially mounted in the post 4 and have their inner ends communicating with the bore 6. These tubes are preferably equally spaced and outwardly extend from the post 4 in a manner similar to the spokes in a wheel. A plate 14, having an upwardly turned annular flange 15 and a depressed central portion 16, is secured to the upper end of the post 4 by such means as screw 17. The depressed portion 16 of the plate 14 is preferably circular in form and provides a seat for a tray 18 having a correspondingly depressed portion 19 adapted to be received within the depression 16 in the plate 14, as shown in Figure 1. The depression 16 in the plate 14 thus provides a centering means for the tray 18, when positioned thereon.

The means provided for supporting the article in the heater consists of a supporting member 21 having a plurality of outwardly extending or radial arms 22 adapted to engage the upper edge of the wall 18 of the tray. Upon this supporting member, the flask 23, containing the wax pattern surrounded by the initially moist investment material, is positioned with the usual sprue hole 24 extending downwardly as shown. Lugs 25 are struck out of the metal of the arms 22, and are adapted to engage the outer surface of the wall 18 of the tray, thereby to center the supporting member 21 upon the tray. An annular casing 26 is received within the flange 15 of the plate 14 and extends upwardly to provide a closure for the article to be heated and for the heating members annularly disposed around the tray 18.

The means provided for heating the flask 23 is best shown in Figure 1, and comprises a plurality of upright tubular gas discharge members 27, each provided with a plurality of ports 28, as shown. A cap 29 is provided at the upper end of each member 27 to provide a closure therefor.

A feature of this invention resides in the novel mounting and arrangement of the tubular gas discharge members 27, which permits these members to be independently adjusted with respect to one another, both radially, vertically and rotatably. Each member 27 has its lower end slidably mounted in a threaded extension 31 of a fitting 32, having a bore 33 therein adapted to receive one of the tubes 13, as shown at the right hand side of Figure 1. A gas passage 34 is provided in each fitting 32 to establish communication between the lower end of the member 27 and the tube 13 engaged therewith. Each fitting 32 further has a packing nut 35 adapted to receive its complementary tube 13, and these packing nuts provide means for tightening the joints between the bores 33 and the tubes 13, to prevent leakage therebetween and to provide the proper frictional contact between each two members. A similar packing nut 36 is received in threaded engagement with the extension 31, and has a gland 37 mounted therein, through which the member 27 passes. By tightening the packing nuts 36, the glands 37 will be forced inwardly against their respective members 27 to prevent leakage, and also whereby the proper degree of frictional contact may be obtained between the extensions 31 and the members 27.

By thus mounting the fittings 32 upon the tubes 13, each fitting may be moved outwardly to the dotted line positions shown in Figure 1, whereby the heating device may be adapted for heating flasks or articles of different sizes and diameters. The particular mounting of the tubes 27 in the extensions 31 of the fittings 32 also permits the tubes to be adjusted vertically, as indicated by the dotted lines in Figure 1, and also whereby each tube may be rotated in its extension 31 to direct the flames either radially against the flask or tangentially with respect thereto. Thus, it will be noted that the tubular gas discharge members 27 are universally adjustable, that is, they may be adjusted radially, vertically, and rotatably, whereby the heating device may be adapted for use to heat flasks of various shapes and diameters.

Each fitting 32 is provided with an extension 38 extending downwardly through a series of radial slots 39, provided in the upper wall 3 of the base 2. These extensions engage the sides of the slots 39 to prevent the fittings from being relatively rotated upon the tubes 33. The slots 39 also provide means for limiting the outward movement of the fittings, as indicated by the dotted lines in Figure 1.

A plurality of trays or drip pans of different sizes are preferably provided with each heating device, as shown in Figures 4, 5, and 6. Figure 4 illustrates a comparatively small tray 18, Figure 5 a medium sized tray 41, and Figure 6 shows a relatively larger tray 42. Each tray is provided with the central depression 19, adapted to be demountably received in the depression 16, provided in the plate 14, as shown in Figure 1. The outer vertical wall of each tray is adapted to be engaged by the upright gas discharge members 27 to provide a gauge therefor for a given size flask, as for instance, for a flask two inches in diameter, a tray three inches in diameter may be used, thus spacing the wall of the flask one half inch from the members 27, as shown in Figure 1. When a flask is to be heated in the device, a certain sized tray (determined by the size of the flask), will be positioned upon the plate 14, as shown in Figure 1, after which the members 27 will be moved inwardly into engagement with the upright annular wall of the tray, as shown in Figures 1 and 2. These trays therefore have a dual function; first, in providing means for catching or receiving the moisture discharged from the sprue hole 24, caused by the heating of the investment material in the flask, and, secondly, each tray provides means for gauging or limiting the inward movement of each gas discharge member 27 for a given size flask.

Figure 8 illustrates the heating device positioned to heat an oval flask 43, the outline of which is indicated in dotted lines. This oval tray 44 is also provided with a central depression 19, adapted to be received in the depression 16 of the plate 14, after which the gas discharge members 27 may be moved inwardly into engagement with the upright wall of the tray, which similarly provides a gauge therefor.

In operation, the gas discharge members 27 are first adjusted to a position such as shown in Figure 1, for a given size flask, after which the flask is positioned upon the supporting member 21 and the gas turned on and ignited to cause the flask to become heated. As the flames are directed against or towards the wall of the flask, the heat is gradually communicated through the moist investment material to the wax pattern, which becomes fluid at a temperature of approximately 212 degrees Fahrenheit, and flows by gravity through the sprue hole 24 into the tray 18. The radiated heat progressively drives inwardly molecules of free water adjacent the flask in such a manner that the melting wax does not soak into the investment material but is discharged from the cavity in the investment material, through the sprue hole 24 as above stated. The outer portions of the investment material will be initially heated to such high temperature that the free moisture contained in the successive outer portions of the investment material will be partially converted into steam which will penetrate inwardly through the investment material to the pattern cavity, and will force ahead of it, the water that has not been converted into steam. This water, under pressure of the steam, will practically all flow into the mold cavity and will carry out the melted wax through the sprue hole. Obviously, as the heat further penetrates the investment material, more and more moisture will be driven out and all traces of the melted wax will be removed so that the wax will not be absorbed by the investment material, thereby eliminating all wax so that there will not be any wax or wax residue left to be burned or carbonized in the mold to form a lining therein, disadvantageous to perfect dental castings.

By the novel mounting and arrangement of the upright gas discharge members or tubes 27, the heating device is adjustable for use in heating various sizes of flasks, which is an important feature, as it does away with the necessity of having to carry a number of different sized heating devices on hand in order to heat all sizes of flasks. In order to efficiently heat the flask, the gas discharge members 27 are usually positioned a certain distance away from the wall of the flask, such for instance, as one-half inch. Thus, it will readily be seen that by providing each size flask with a certain sized drip pan or tray, the desired space or distance required between the tubular members 27 and the wall of the flask, may readily be obtained by simply inwardly moving the fittings 32 until the members 27 engage the upright annular wall of the tray. If the heating device is used for heating flasks of uniform diameters, the tubular members 27 may be locked in adjusted positions by tightening the packing nuts 35 and 36. The construction of the device, as a whole, is also very simple and inexpensive, whereby it may be manufactured at a minimum cost. The particular mounting of the tubular gas discharge members 27 also permits the latter to be readily removed from the fittings 32 for cleaning or replacement.

I claim as my invention:

1. In a heating device, the combination of a base, means thereon for supporting an object to be heated, and a plurality of upright heating elements annularly disposed around said supporting means and adapted to heat an object, said heating elements being adjustable radially, whereby the device is adapted for heating objects of various sizes.

2. In a heating device, the combination of a base, means thereon for supporting an object to be heated and a plurality of upright heating elements annularly disposed around said supporting means and adapted to heat an object, said heating elements being adjustable radially and vertically, whereby the device is adapted for heating objects of various sizes.

3. In a heating device, the combination of a base, means thereon for supporting an object to be heated, tubular members annularly disposed around said supporting means, means for supplying a combustible gas to said tubular members, and said members being adjustable with respect to one another whereby the device is adapted for heating objects of various sizes.

4. In a heating device, the combination of a base, means thereon for supporting an object to be heated, tubular members annularly disposed around said supporting means, means for supplying a combustible gas to said tubular members, and said members being independently adjustable radially, vertically, and rotatively with respect to one another, whereby the device may be adapted for heating objects of various sizes.

5. In a heating device, the combination of a base having means thereon for supporting an object to be heated, a plurality of tubular members mounted to encircle said supporting means, said members being independently adjustable with respect to one another, a plurality of gas discharge ports in the walls of said tubular members, and means for supplying a combustible gas to said tubular members.

6. In a heating device, the combination with a base having a gas supply pipe mounted therein, means on said base for supporting an object to be heated, a plurality of tubular members encircling said supporting means and having their lower ends communicating with said gas supply pipe through a movable fitting, whereby the tubular members may be adjusted with respect to one another to adapt the device for heating objects of different sizes, and the walls of said tubular members being apertured for the discharge of gas therefrom.

7. In a heating device, the combination with a base having a post centrally mounted thereon, means secured to the upright end of said post for supporting an article to be heated, a plurality of tubes terminally secured to said post and outwardly extending therefrom, a fitting slidably mounted upon each tube, a tubular member mounted in each of said fittings and having a plurality of spaced apertures in the walls thereof for the emission of gas therefrom, and a combustible gas supply means connected with said post and communicating with said tubular members through said fittings.

8. In a heating device, the combination with a base having a post centrally mounted thereon, means secured to the upright end of said post for supporting an article to be heated, a plurality of tubes terminally secured to said block and outwardly extending therefrom, a fitting slidably mounted upon each tube, and a tubular member movably mounted in each of said fittings and having a plurality of spaced apertures in the walls thereof for the emission of gas therefrom, a combustible gas supply means connected with said post and communicating with said tubular members through said fittings, and means for locking said tubular members in their adjusted positions.

9. In a heating device, the combination with a base having an upright post secured thereto, a plurality of cylindrical tubes terminally mounted in said post and outwardly extending therefrom, a fitting slidably mounted upon each of said tubes, an upright tubular member mounted in each of said fittings and each having a plurality of ports provided in the walls thereof for the emission of gas therefrom, and said tubular members being adapted for vertical and rotary adjustment in said fittings.

10. In a heating device, the combination of a base having a gas supply pipe mounted therein, a tray mounted upon said base for supporting an object to be heated, a plurality of upright tubular members mounted to encircle said tray and having their lower ends communicating with said gas supply pipe, and the connections between said tubular members and said gas supply pipe permitting radial adjustment of said members with respect to the axis of said base, whereby the device is adapted for heating objects of different sizes.

11. In a heating device, the combination of a base having a gas supply pipe mounted therein, a tray removably mounted upon said base for supporting an object to be heated, a plurality of upright tubular members mounted to encircle said tray and having their lower ends communicating with said gas supply pipe, and the connections between said tubular members and said gas supply pipe permitting radial and vertical adjustment of said members with respect to said base, whereby the device may be utilized for heating objects of different sizes.

12. In a heating device, the combination with a base having an upright post mounted thereon, means secured to the upper end of the post for supporting a tray, a supporting member carried by the walls of said tray for supporting an object to be heated, and a plurality of upright tubular members encircling said tray and having their walls apertured for the discharge of combustible gas therefrom against or towards an object disposed upon said supporting member, and the lower ends of said tubular members having a sliding connection with said gas supply pipe whereby said tubular members may be adjusted independently of one another to adapt the device for heating objects of different sizes.

13. In a heating device, the combination with a base having an upright post mounted thereon, a plate secured to the upper end of the post and having a depression therein adapted to receive and support a tray thereon, a supporting member carried by the walls of said tray for supporting an object to be heated, and a plurality of upright tubular members encircling said tray and having their walls apertured for the discharge of combustible gas therefrom against or towards an object disposed upon said supporting member, and the lower ends of said tubular members having a sliding connection with said gas supply pipe whereby said tubular members are adjustable independently of one another to adapt the device for heating objects of different sizes.

14. In a device for heating dental flasks, the combination with a base having a gas supply pipe mounted therein, a plurality of upright gas discharge members adjustably mounted upon said base and adapted for radial adjustment, a support centrally provided upon said base between said gas discharge members, a tray adapted to be mounted upon said support, and the outer annular wall of said tray providing a gauge for the adjustment of said tubular members for a given size flask.

15. In a device for heating dental flasks, the combination with a base having a gas supply pipe mounted therein, a plurality of upright gas discharge members adjustably mounted upon said base and adapted for radial and vertical adjustment, a support centrally mounted upon said base between said gas discharge members, a tray adapted to be mounted upon said support, means for centering the tray thereon, and the outer annular wall of said tray providing a gauge for the adjustment of said tubular members for a given size flask.

16. In a device for heating dental flasks, the combination of a base, a plurality of radially disposed tubes mounted on said base, each having one end communicating with a source of gas supply, a plurality of upright gas discharge members movably connected with said tubes and adapted for radial adjustment thereon, a plate also supported upon said base and having a central depression therein, a tray adapted to be supported upon said plate and having a depressed portion adapted to be received in the depression in said plate for centering the tray thereon, and the outer upright wall of said tray being adapted to be engaged by said tubular members to provide a gauge therefor for a given size flask.

17. In a device for heating dental flasks, the combination of a base, a post mounted thereon, a bore provided in the lower portion of said post and having a gas supply connection communicating therewith, a plurality of radially disposed tubes mounted in said post and communicating with said bore, a plurality of upright gas discharge members movably connected with said tubes and adapted for radial adjustment thereon, a plate secured to the upper end of said post and having a central depression therein, a tray adapted to be supported upon said plate and having a depressed portion adapted to be received in the depression in said plate for centering the tray thereon, and the outer upright wall of said tray being adapted to be engaged by said tubular members to provide a gauge therefor for a given size flask.

18. A heating device comprising a member adapted to support an object to be heated, a plurality of heating elements mounted around said member and arranged in spaced relation, a support common to said elements, arms on said support each adapted to movably support one of said elements, and means for supplying a heating medium to each heating element.

19. A heating device comprising a member adapted to support an object to be heated, a plurality of heating elements mounted around said member and arranged in spaced relation, a support common to said elements, arms on said support each adapted to slidably support one of said elements and to permit adjustment thereof to and from said object-supporting member, and means for supplying a heating medium to each heating element.

20. A heating device comprising a member adapted to support an object to be heated, a plurality of heating elements adjustably mounted adjacent to said member and arranged in substantially parallel relation, a central conduit adapted to supply a heating medium to said elements, and non-flexible means connecting said elements with said conduit.

21. A device of the class described, comprising means adapted to support a dental flask, and a plurality of heating elements arranged around said supporting means and adapted to uniformly heat substantially the entire wall of said flask, said heating elements being mounted for radial adjustment whereby they may be positioned for heating flasks of different diameters.

In witness whereof, I have hereunto set my hand this 22d day of July, 1927.

LAURITZ B. ANDRESEN.